N. J. BLATHERWICK.
HORSESHOE.
No. 170,809.  Patented Dec. 7, 1875.
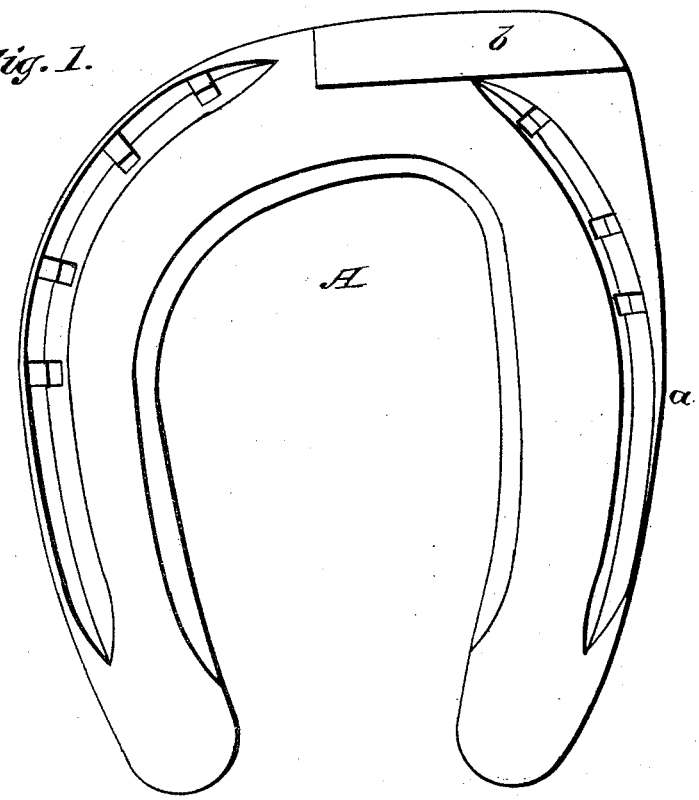
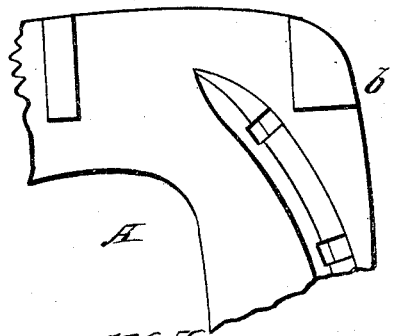
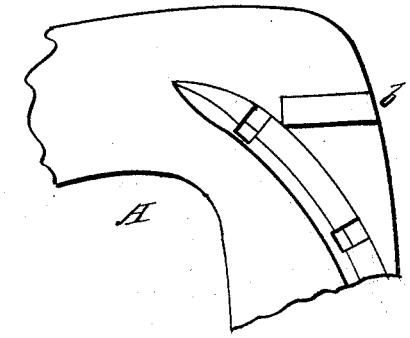
WITNESSES:
O. W. Bond.
H. L. Vallette
INVENTOR:
Nelson J. Blatherwick
By West & Bond Attys

UNITED STATES PATENT OFFICE.

NELSON J. BLATHERWICK, OF CHICAGO, ILLINOIS.

IMPROVEMENT IN HORSESHOES.

Specification forming part of Letters Patent No. 170,809, dated December 7, 1875; application filed October 25, 1875.

*To all whom it may concern:*

Be it known that I, NELSON J. BLATHERWICK, of the city of Chicago, Cook county, State of Illinois, have invented a new and useful Improvement in Horseshoes, of which the following is a full description, reference being had to the accompanying drawings, in which—

Figure 1 is a plan view, showing the outside or face of the shoe; Figs. 2 and 3, details.

The object of this invention is to construct a shoe to prevent horses from interfering.

In shoeing horses which interfere, it has been customary to cut away the hoof upon the inside, and make the shoe correspond with the form of the hoof so cut away, it being supposed that by so doing the shoe will be carried somewhat away from the opposite foot, and interfering be prevented; but this practice is faulty, because the support upon the inside of the foot is partially removed, and thereby, in traveling, the ankle of the horse is thrown inward, and when the foot leaves the ground it follows the position of the ankle, and is more likely to strike the opposite leg than if the hoof be left in its natural position.

I overcome the difficulty by making the shoe broader and fuller upon the inside than upon the outside, enlarging it at the toe and upon the inside, thus increasing the support for the horse at that point, the effect of which is that, in traveling, this point is the last to leave the ground, and the tendency is to throw the ankle of the horse outward, and away from the opposite leg, instead of inward and toward it, and when the foot leaves the ground it follows this position of the ankle, and is thrown away from, rather than toward, the opposite leg. When the ankle is in the position described the opposite hoof can pass without interfering.

In the drawings, A represents a shoe constructed in accordance with my plan. It is designed for the right fore foot. The shoe is so made that the point $a$ will be on a line with the hoof on the inside, and from that point the shoe extends forward almost on a direct line, instead of being curved, as usual, so that at the point $b$ the shoe is considerably broader and fuller than upon the opposite side.

When a toe-calk is used it may be located as represented in Fig. 1—that is, considerably to one side of the shoe, and coming to, or nearly to, the outer edge thereof. The toe-calk might be located as represented in Fig. 2, which will be the same thing, substantially; or a single toe-calk could be located as represented in Fig. 3.

For horses which interfere behind, the shoe should be constructed as described, except that it is made somewhat lighter for the hind foot than for the fore foot.

Heel-calks can be used as in ordinary shoes, if desired.

I do not limit myself to the specific form of toe-calks shown, the gist of my invention being in so constructing the shoe that the weight of the horse will be thrown upon the inside of the foot at or near the point $b$. I would recommend the toe-calk shown in Fig. 3 more particularly for shoes designed for the hind feet.

What I claim as new, and desire to secure by Letters Patent, is as follows:

A horseshoe enlarged upon the inner side at and near the point $b$, and formed substantially as specified, for the purpose set forth.

NELSON J. BLATHERWICK.

Witnesses:
E. A. WEST,
O. W. BOND.